（12）United States Patent
Hung et al.

(10) Patent No.: US 6,327,909 B1
(45) Date of Patent: Dec. 11, 2001

(54) BISTABLE MECHANICAL SENSORS CAPABLE OF THRESHOLD DETECTION AND AUTOMATIC ELIMINATION OF EXCESSIVELY HIGH AMPLITUDE DATA

(75) Inventors: Elmer Hung, Foster City; Andrew A. Berlin, San Jose; Feng Zhao, Campbell, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,442

(22) Filed: Nov. 30, 1999

(51) Int. Cl.[7] .................... G01P 15/00; G01D 21/00; H01H 57/00
(52) U.S. Cl. ................... 73/514.16; 73/651; 200/181
(58) Field of Search ............ 73/514.16, 514.25, 73/514.38, 862.625, 862.621, 862.626, 862.627, 651, 649; 200/181, 61.48, 61.51

(56) References Cited

U.S. PATENT DOCUMENTS

| | | | | |
|---|---|---|---|---|
| 4,638,669 | * | 1/1987 | Chou | 73/514.25 |
| 5,001,933 | * | 3/1991 | Brand | 73/651 |
| 5,431,051 | * | 7/1995 | Biebl et al. | 73/862.625 |
| 5,638,946 | * | 6/1997 | Zavracky | 73/514.16 |
| 6,046,659 | * | 4/2000 | Loo et al. | 200/181 |
| 6,057,520 | * | 5/2000 | Goodwin-Johansson | 200/181 |
| 6,127,744 | * | 10/2000 | Streeter et al. | 200/181 |

* cited by examiner

Primary Examiner—Helen Kwok
(74) Attorney, Agent, or Firm—Finnegan, Henderson, Farabow, Garrett & Dunner, L.L.P.

(57) ABSTRACT

A bistable sensor with a tunable threshold for use in microelectromechanical systems. The sensor uses electrostatic force to modify the threshold and to disable the sensor in a deflected position once a sustained extreme in vibration is detected. Potential applications include mechanical implementations of signature analysis to automatically eliminate large amplitude noise at a specific frequency, shock detection without requiring quiescent DC power consumption, and determination of the magnitude of a shock.

20 Claims, 6 Drawing Sheets

BISTABLE MECHANICAL SENSORS CAPABLE OF THRESHOLD DETECTION AND AUTOMATIC ELIMINATION OF EXCESSIVELY HIGH AMPLITUDE DATA

FIELD OF THE INVENTION

The present invention relates generally to the field of acceleration and shock sensors, and more particularly to bistable threshold sensors.

BACKGROUND OF THE INVENTION

Micro-Electro-Mechanical Systems (MEMS) integrate mechanical elements, such as microsensors and microactuators, and electronics on a common substrate through the utilization of microfabrication technology. MEMS are typically micromachined using integrated circuit (IC) compatible batch-processing techniques that selectively etch away parts of a silicon wafer or add new structural layers. MEMS range in size from several micrometers to many millimeters. These systems sense, control, and actuate on a micro scale and function individually or in arrays to generate effects on a macro scale.

Microsensors, such as acceleration and shock sensors, are known in the prior art. While shock sensors come in many shapes and sizes, they typically involve the use of a suspended structure to detect vibration with peak excursions of that structure closing an electrical contact to indicate that a shock has occurred or a threshold has been exceeded. Acceleration sensors typically use a resonant structure to detect motion. One type of detector includes a silicon mass suspended by silicon beams with ion implanted piezoresistors on the beams to sense motion. Another type of detector uses capacitance changes to detect movement of the beam. Another type employs a shift in a physical load to produce a shift in the structure's resonant frequency.

A conventional shock sensor is shown in FIG. 1. Shock sensor 10 includes substrate 11, insulating layer 12, conductive cantilever 13 having a free end and fixed end, and contact conductor 14. Voltage is applied to the conductive cantilever 13 that serves as the top electrode. Contact conductor 14 serves as the bottom electrode. A shock with sufficient magnitude causes the free end of conductive cantilever 13 to touch contact conductor 14 completing the circuit. Current is detected by an ammeter (17). Once the circuit is completed, however, it immediately opens again. Thus, the detector must be continuously monitored to detect a shock. This can be a problem for one time use applications that require a sensor to disable itself when an extreme vibration is detected. Another problem is that the amplitude of a shock that causes the cantilever to close the electrical contact is fixed by the material properties and geometry of the sensor. Thus, variation of the detection threshold can only be made by physical modification of the distance between the electrodes.

An example of a conventional acceleration sensor is provided by U.S. Pat. No. 4,855,544. It discloses acceleration sensor 20 including a cantilevered beam 23 having an integral end mass at the free end of the beam as shown in FIG. 2. Prior art acceleration sensor 20 further includes substrate 21, insulating layer 22, and bottom conductor 24. Acceleration causes deflection of the free end of beam 23 from a relaxed condition. As acceleration increases, beam 23 will move to an increasingly strained condition with the free end moving towards bottom conductor 24. Movement of beam 23 is typically detected by a capacitance measurement. One problem with this prior art accelerometer is that there is no simple mechanism for threshold detection. Thus, it cannot automatically disable itself to eliminate large amplitude noise at a specific frequency.

In light of the foregoing, there is a need for bistable threshold sensors that can detect extremes in acceleration and that allow the detection threshold to be electrically modified.

SUMMARY OF THE INVENTION

Accordingly, the present invention is directed to bistable micromechanical sensors that can detect extremes in acceleration and that allow the detection threshold to be electrically modified that substantially obviates one or more of the problems due to limitations and disadvantages of the related art.

In accordance with the purposes of the present invention, as embodied and broadly described, the invention provides a bistable threshold sensor including a substrate, a resonant structure over the substrate with a fixed portion and a free portion as a first electrode, a ground conductor layer on the substrate as a second electrode, and an insulating layer over the ground conductor. The sensor further includes a contact conductor on a portion of the insulating as a third electrode, wherein the free portion of the resonant structure contacts the contact conductor when the resonant structure is in a deflected position, and a voltage source for providing a bias voltage between the first electrode and the second electrode.

In another embodiment, the invention provides a method for threshold detection including providing a bistable threshold sensor having a detection threshold. The sensor includes a resonant structure as a first electrode, wherein the resonant structure has an elastic restoring force, a ground conductor as a second electrode, a contact conductor as a third electrode, wherein a gap exists between the first and second electrode, a bias voltage between the first and a second electrode creating a nonlinear electrostatic force, and wherein the threshold is determined by the elastic restoring force, the gap, and the electrostatic force. The method further includes the step of electrostatically locking the resonant structure in a deflected position once the detection threshold is reached.

The accompanying drawings are included to provide a further understanding of the invention and are incorporated in and constitute a part of this specification, illustrate several embodiments of the invention and together with the description serve to explain the principles of the invention.

BRIEF DESCRIPTION OF THE DRAWINGS

The accompanying drawings, which are incorporated in and constitute a part of this specification, illustrate an embodiment of the invention and, together with the description, serve to explain the objects, advantages, and principles of the invention.

DETAILED DESCRIPTION OF THE PREFERRED EMBODIMENTS

Reference will now be made in detail to the preferred embodiments of the invention, examples of which are illustrated in the accompanying drawings.

Figure 1:
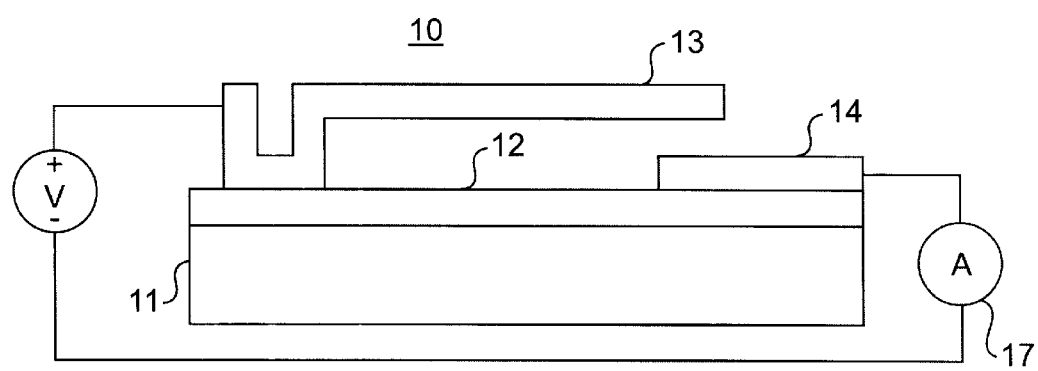
FIG. 1 is a schematic side view of a prior art shock sensor.
Figure 2:
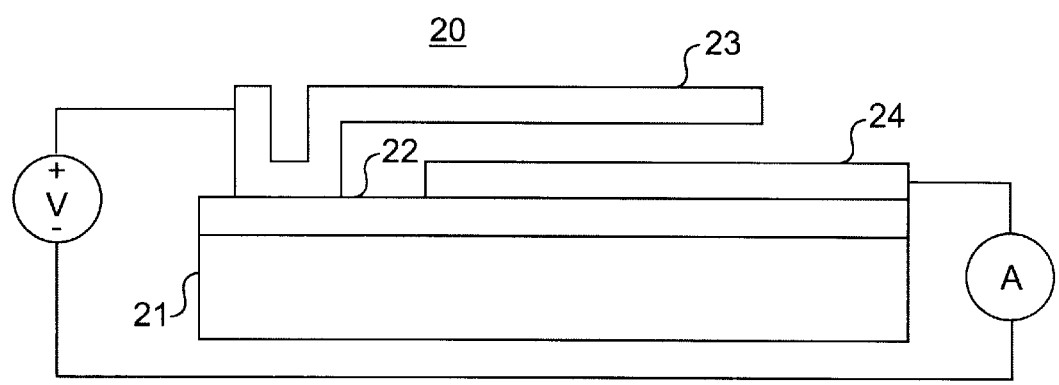
FIG. 2 is a schematic side view of a prior art acceleration sensor.
Figure 3:
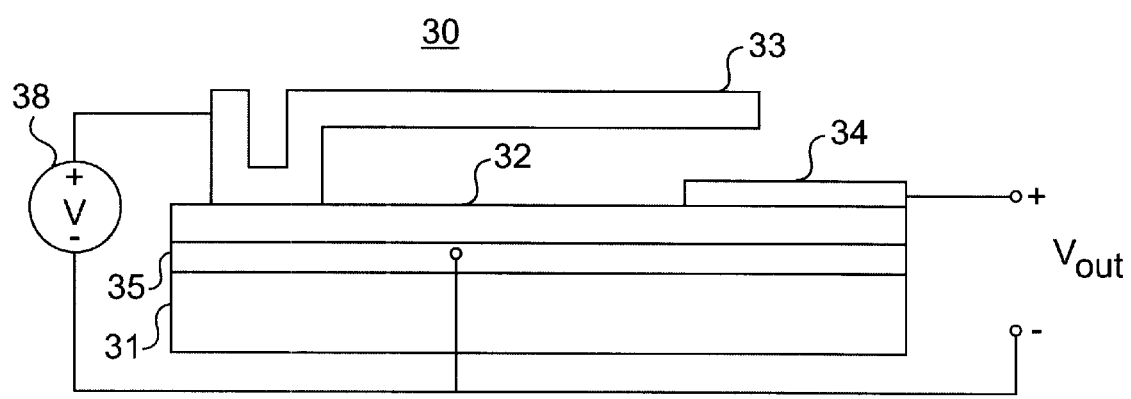
FIG. 3 shows a bistable threshold sensor consistent with one embodiment of the present invention.

FIG. 3 depicts a bistable threshold sensor consistent with one embodiment of the present invention. Sensor 30 includes substrate 31 that can be a silicon wafer or any other semiconductor base material. Ground conductor 35 is formed over substrate 31 and insulating layer 32 is formed over ground conductor 35. Resonant structure 33 is fixed to insulating layer 32 and has an equilibrium or undeflected position. Contact conductor 34 is formed over a portion of insulating layer 32. Contact conductor 34 is positioned with respect to cantilevered beam 33 so that contact can only occur when cantilevered beam 33 is in a deflected state. Voltage source 38 provides a bias voltage between resonant structure 33 and ground conductor 35. No voltage is applied between resonant structure 33 and contact conductor 34. Sensor 30 is fabricated using conventional micromachining techniques from materials known in the art.

Resonant structure 33 is shown in FIG. 3 as a cantilevered beam having a fixed end and a free end. To avoid stiction problems due to charging or welding effects, dimples can be provided on the surface of beam 33 that touches the contact conductor or on the contact conductor itself. Although it is shown as a cantilevered beam in FIG. 3, resonant structure 33 can be any structure typically used in accelerometers. Examples include proof mass structures, doubly fixed beams, as well as more complicated geometries.

When used to detect a certain threshold of high amplitude sustained vibration at a frequency close to the resonant frequency of resonant structure 30, the bistable sensor is preferably used in a vacuum. When used as a shock sensor, sensor 30 is preferably used in an ambient atmosphere.

The free end of cantilevered beam 33 serves as a top electrode and ground conductor 35 serves as the bottom electrode. Contact conductor 34 acts as another electrode. The voltage provided by voltage source 38 between cantilever 33 and ground conductor 35 can be scaled to a wide range of voltages and depends on a number of factors including the stiffness of the cantilever, the mass of the cantilever, and the gap distance between the free end of the cantilever and the contact conductor. The voltage, however, is preferably on the order of several volts.

Detection threshold of sensor 30 can be modified in the conventional manner by changing the gap distance between cantilevered beam 33 and the contact conductor 34, as well as by modifying the materials of construction or the geometry of cantilevered beam 33. The detection threshold of sensor 30, however, can also be electrically modified by changing the bias voltage. As the bias voltage increases, the detection threshold decreases due to the increase in direct current (DC) force pushing cantilevered beam 33 towards ground conductor 35. Thus, by adjusting the detection threshold, a sensor can be configured to detect a shock occurring at a particular moment or during a momentary system configuration of interest. The maximum threshold is set by the gap distance, as well as the material properties and the geometry of resonant structure 33. The minimum threshold can be set close to zero, if a sufficient DC voltage is applied to allow resonant structure 33 to deflect by itself.

Figure 4:
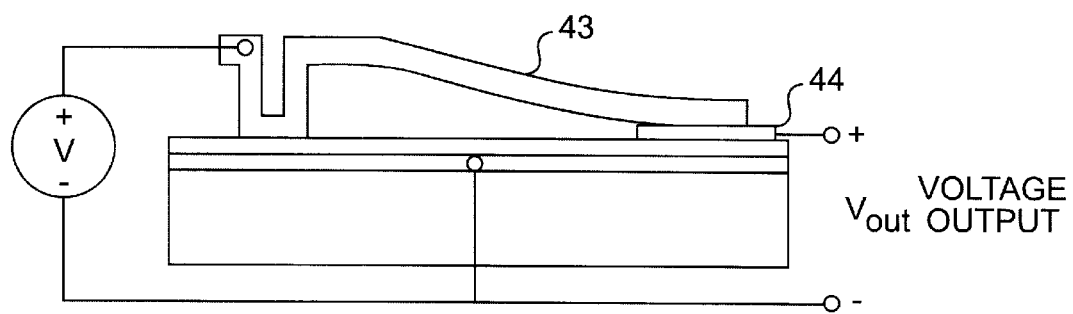
FIG. 4 shows a bistable threshold sensor in a post-threshold mode consistent with one embodiment of the present invention.

When the amplitude vibration due to shock or acceleration is below the detection threshold, sensor 30 functions in the same manner as conventional shock and acceleration sensors. In other words, cantilevered beam 33 responds by deflecting and eventually returning to its equilibrium position. When the amplitude of the shock or vibration increases beyond the threshold of detection, however, the large displacement of cantilevered beam 33 causes it to enter a region in which the nonlinear electrostatic attractive forces created by the bias voltage overcome the elastic restoring force of the cantilevered beam. Once this occurs, cantilevered beam 33 deflects and is electrostatically locked in a position against contact conductor 34. In the post-threshold mode of operation shown in FIG. 4, cantilevered beam 33 remains electrostatically locked in the deflected position regardless of any subsequent shock or vibration. Since no voltage is applied between beam 33 and contact conductor 34, no quiescent power is drawn. Occurrence of the post-threshold mode can then be sensed at a later time by applying voltage between beam 33 and contact conductor 34.

In another embodiment, a constant voltage is applied between resonant structure 33 and contact conductor 34 to detect the timing of the occurrence of the post-threshold mode.

In still another embodiment, bistable threshold sensor 30 includes additional sensors to measure the motion of resonant structure 33. Suitable sensors include capacitive, piezoresistive or any other sensor used to measure motion of a resonant structure.

One application of bistable threshold sensors consistent with the present invention is the measurement of the magnitude of a shock. This can be accomplished by providing a plurality of sensors each having a different electrically set threshold. All sensors having a threshold below the magnitude of the shock will be locked in the post-threshold or deflected position. Sensors having a threshold above the magnitude of the shock will be in the equilibrium or undeflected position.

Another application of bistable threshold sensors consistent with the present invention is a signal processing fuse. Specifically, an array of sensors can be used to detect a specific frequency spectrum, including specific frequency characteristics of interest, within complex vibration stimuli. One example is environment noise centered at a specific frequency that dominates the response of a conventional detector. Bistable threshold sensors consistent with the present invention, however, can disable themselves when the high-amplitude signals are detected. Once the amplitude of the noise rises above the threshold, cantilevered beam 33 is electrostatically locked in the deflected position regardless of any subsequent shock or vibration. Once the amplitude of the noise falls below the threshold, cantilevered beam 33 is released by decreasing the bias voltage. The sensor is then ready to detect the desired frequency spectrum or characteristic.

Figure 5:
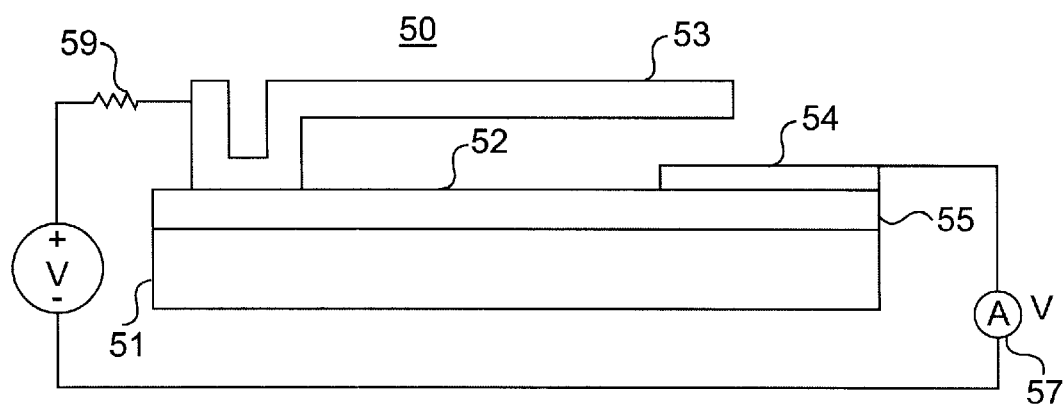
FIG. 5 shows a bistable threshold sensor consistent with another embodiment of the present invention.

Another embodiment of a bistable threshold sensor consistent with the present invention is shown in FIG. 5. In this configuration, current-limiting resistor 59 is used to achieve bistablity with only two electrodes. Sensor 50 includes substrate 51, ground conductor 55 formed over substrate 51, contact conductor 54, and insulating layer 52 formed over ground conductor 55. Resonant structure 53 is fixed at one end to insulating layer 52. Resonant structure 53 is again shown as a cantilevered beam in FIG. 5, but can be any structure used in accelerometers. The post-threshold mode is determined by detection of a voltage at ammeter 57.

Figure 6:
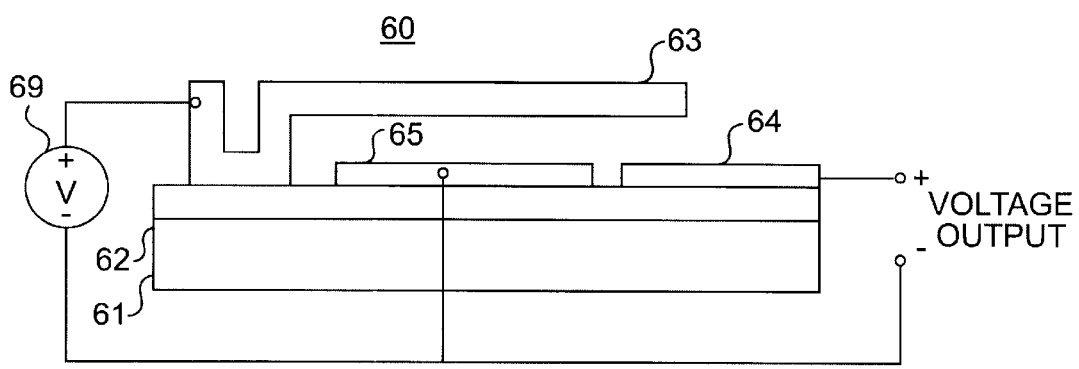
FIG. 6 shows a bistable threshold sensor consistent with another embodiment of the present invention.

Another embodiment of a bistable threshold sensor consistent with the present invention is shown in FIG. 6. Sensor 60 includes substrate 61 with insulating layer 62 formed over substrate 61. Ground conductor 65 and contact conductor 64 are formed on different portions of insulating layer 62. Resonant structure 63 is formed on another portion of insulating layer 62 so as to have a fixed end and a free end. Voltage source 69 provides a bias voltage between ground conductor 65 and resonant structure 63. To avoid stiction problems due to charging or welding effects, dimples can be provided on the surface of beam 63 that touches the contact conductor 64 or on the contact conductor itself. These dimple also prevent beam 63 from contacting insulator 62 or ground conductor 65. The manner of operation of this sensor, however, is similar to previously discussed embodiments.

It will be apparent to those skilled in the art that various modifications and variations can be made in the bistable threshold sensor. Thus, it is intended that the present invention cover the modifications and variations of this invention provided they come within the scope of the appended claims and their equivalents.

What is claimed is:

1. A bistable threshold sensor comprising:
   a substrate;
   a resonant structure over the substrate with a fixed portion and a free portion as a first electrode;
   a ground conductor layer on the substrate as a second electrode;
   an insulating layer over the ground conductor;
   a contact conductor on a portion of the insulating layer as a third electrode, wherein the free portion of the resonant structure contacts the contact conductor when the resonant structure is in a deflected position; and
   a voltage source for providing a changeable bias voltage between the first electrode and the second electrode that allows a detection threshold to be electrically modified.

2. The threshold sensor of claim 1, wherein the resonant structure has dimples protruding from a surface opposing the contact conductor.

3. The threshold sensor of claim 1, wherein the resonant structure is one selected from the group comprising a cantilevered beam, a doubly fixed beam, and a proof mass.

4. The threshold sensor of claim 1, further including a sensor to detect the motion of the resonant structure.

5. The threshold sensor of claim 1, further including a voltage between the first and third electrodes.

6. A bistable threshold sensor comprising:
   a substrate;
   a resonant structure with a fixed portion and a free portion with respect to the substrate as a first electrode;
   an insulating layer over the substrate;
   a ground conductor layer on a portion of the insulating layer as a second electrode;
   a contact conductor on another portion of the insulating layer as a third electrode, wherein the free portion of the resonant structure contacts the contact conductor when the resonant structure is in a deflected position; and
   a voltage source for providing a changeable bias voltage between the first electrode and the second electrode that allows a detection threshold to be electrically modified.

7. A bistable threshold sensor comprising:
   a substrate;
   a ground conductor layer formed over the substrate;
   an insulator layer formed over the ground conductor;
   a cantilevered beam formed on the insulating layer with a free end and a fixed end;
   a contact conductor formed on a portion of the insulator as a third electrode, wherein the free end of the cantilevered beam contacts the contact conductor when the cantilevered beam is in a deflected position; and
   a voltage source for providing a changeable bias voltage between the first electrode and the second electrode to modify a detection threshold and to hold the cantilevered beam in a deflected position once the detection threshold is reached.

8. The threshold sensor of claim 7, wherein the free end of the cantilevered beam has dimples protruding from a surface opposing the contact conductor.

9. The threshold sensor of claim 7, further including a sensor to detect the motion of the cantilevered beam.

10. The threshold sensor of claim 7, further including a voltage between the first and third electrodes.

11. A bistable threshold sensor comprising:
    a substrate;
    a resonant structure over the substrate as a first electrode;
    a ground conductor over the substrate as a second electrode;
    an insulator layer over the ground conductor;
    a current limiting resistor connected between the first and second electrodes; and
    an adjustable bias voltage between the first and second electrodes that allows a detection threshold to be electrically modified.

12. The threshold sensor of claim 11, wherein the resonant structure has dimples protruding from a surface opposing the contact conductor.

13. The threshold sensor of claim 11, wherein the resonant structure is one selected from the group comprising a cantilevered beam, a doubly fixed beam, and a proof mass.

14. The threshold sensor of claim 11, further including a sensor to detect the motion of the resonant structure.

15. A method of threshold detection comprising the steps:
    providing a bistable threshold sensor having a detection threshold, the sensor comprising
       a resonant structure as a first electrode, wherein the resonant structure has an elastic restoring force,
       a ground conductor as a second electrode,
       a contact conductor as a third electrode, wherein a gap exists between the first and second electrodes,
    an adjustable bias voltage between the first and second electrodes creating a nonlinear electrostatic force, wherein the threshold is determined by the elastic restoring force, the gap, and the electrostatic force;
    electrostatically locking the resonant structure in a deflected position once the detection threshold is reached.

16. The method of claim 15, further including a step of measuring movement of the resonant structure.

17. The method of claim 15, further including a step of applying a voltage between the first and third electrodes to determine whether the detection threshold was reached.

18. The method of claim 15, wherein the threshold is adjusted by changing the bias voltage.

19. The method of measuring the magnitude of a shock including the steps of:
    providing a plurality of bistable sensors with electrically tunable thresholds;
    setting the threshold of each sensor to a different value;
    determining the magnitude of the shock by determining which ones of the plurality of bistable sensors reached its threshold and which of the plurality of bistable sensors have not reached their thresholds.

20. A method of threshold detection comprising the steps:
providing an array of bistable sensors having a threshold acting as a signal processing fuse to detect a desired frequency spectrum within a vibration stimuli, the sensors comprising,
- a resonant structure having an elastic restoring force as a first electrode,
- a ground conductor as a second electrode, wherein a gap exists between the first and second electrodes,
- a contact conductor as a third electrode,
- an adjustable bias voltage between the first and a second electrodes creating a nonlinear electrostatic force, wherein the threshold is determined by the elastic restoring force, the gap, and the electrostatic force;

electrostatically locking the resonant structure in a deflected position once the vibration stimuli reaches the threshold; and releasing the resonant structure to detect the desired frequency spectrum once the vibration stimuli falls below the detection threshold by decreasing the bias voltage.

* * * * *